Nov. 20, 1962 AN WANG 3,065,394

DIGITAL COMPARATOR SERVOSYSTEM

Filed Dec. 15, 1958 3 Sheets-Sheet 1

Nov. 20, 1962 AN WANG 3,065,394

DIGITAL COMPARATOR SERVOSYSTEM

Filed Dec. 15, 1958

3 Sheets-Sheet 2

United States Patent Office 3,065,394

Patented Nov. 20, 1962

3,065,394

DIGITAL COMPARATOR SERVOSYSTEM

An Wang, Lincoln, Mass., assignor to Wang Laboratories, Inc., Natick, Mass., a corporation of Massachusetts Filed Dec. 15, 1958, Ser. No. 780,552
17 Claims. (Cl. 318—28)

This invention relates to electronic control devices and is a continuation-in-part of my application, Serial No. 692,140 filed October 24, 1957, now Patent No. 2,996,249, issued August 15, 1961. More particularly, it relates to a device including a digital comparator for comparing quantities, such as digital numbers having two or more significant figures, usually for equalization of such numbers so that, for instance, an unknown pulse series may be controlled to a value equal to that of one or more predetermined numbers or a stored series of pulses may be valued either by, in effect, counting or by solving an equation wherein they are an input variable.

It is frequently desirable especially in digital control systems, to compare two digital numbers having a plurality of significant figures and control one of them to provide an error signal for equalization or the like. Heretofore, however, for digital accuracy, this apparently simple operation has required that at least one number be counted by conventional digital techniques, and in the case of numbers having many significant figures, this was an operation that required a substantial amount of circuitry.

It is a major object of the present invention to provide a novel digital comparator which does not require counting as with digital techniques and yet which has the accuracy inherent in digital techniques as opposed to analogue techniques.

According to the invention, comparison of digital numbers having any number of significant figures is accomplished, not by counting the entire number, but by evaluating each significant figure of the number in turn beginning with the highest decade of the number. Thus, if a number having three significant figures, for example, "734," is to be compared, as might be required in order to position a controlled element, say, of a machine tool in accordance with either a manual or automatic presetting of such number, according to the present invention the three significant figures are sequentially compared in terms of representative voltages, beginning with the highest decade, "7," thence proceeding to the next highest decade, the "3," and finally completing the comparison with the lowest decade, "4." This sequential action is accomplished by providing a series of relay means, one relay means for each of the significant figures to be compared. Such relay means are interconnected so that the error signal output of such a series as applied, say, for positioning an element and for simultaneously providing a voltage representing a number to be compared with the preset voltage representing the number "734" until equalization occurs, or at least is passed, is first controlled by the highest preset decade "7," until the number to be compared is equal thereto. Thereafter, the highest numbers being equal, the comparison relay associated therewith loses its controlling function, which shifts to the next highest significant figure of the number. Such shifts continue until the last significant figure of the number to be compared has been balanced with the preset number, whereupon positioning of the controlled element, for example, is completed.

In essence, then, the invention provides a series of relay means, the control function of which is progressively shifted or otherwise made effective from the highest to the lowest decade controlling one of the series though not necessarily by deactivating such relay means as by disconnecting them. Each of such relay means has control means to which are applied two voltages representing the preset digital significant figure to be compared and the corresponding significant figure to be compared therewith. Suitable current carrying means responsive to said control means are also provided for each of said relays, said control means providing an output error signal usually effective both to operate a controlled element and to supply the number to be compared in accordance with said control means, generally in terms of a positive or negative voltage or a direction of current flow. The progressive effectiveness or shift of the series of relay means can be produced by the use, for example, of resistance means providing increasing resistance along the series in the direction of the relay means thereof for comparing the lowest significant figure, so that the output taken from the highest decade relay control means controls the system until it becomes ineffective by reason of voltage equalization across its control means, thus shifting control to the next highest, less effective relay means.

Depending upon the ultimate use of the digital comparator of the invention, the relay means forming the series may be of several types. Thus, if high speed is essential, electronic gain producing means, such as conventional vacuum tubes, transistors and the like, may be employed. On the other hand, if high speed is not a necessary requirement, electric relays, preferably of the polarized type, having a control winding effective to operate suitable contacts, may be used, such relays generally being more reliable than are electronic devices.

It is a particular feature of the invention, whatever be the relay means employed therein, that the circuitry is simple and direct, without reliability reducing complications, and enables the comparison of digital numbers, in the form of voltages representing same, having any number of significant figures, although numbers having relatively few significant figures are used as illustrations herein for reasons of simplicity.

Since the operation of the digital comparator of the invention is dependent upon the application to its control means of voltages representing corresponding significant figures of the numbers to be compared, it is a further object of the invention to provide means for converting an input representing a number having a plurality of significant figures to a series of voltages each representative of one of said significant figures. Again, such means may take various forms depending upon the manner in which the numbers to be compared are presented or stored, i.e., pulses, positions of mechanical elements, etc.

Various other objects and features of the invention will be apparent from the following description of preferred embodiments thereof, together with the accompanying drawings, wherein.

Figure 1:
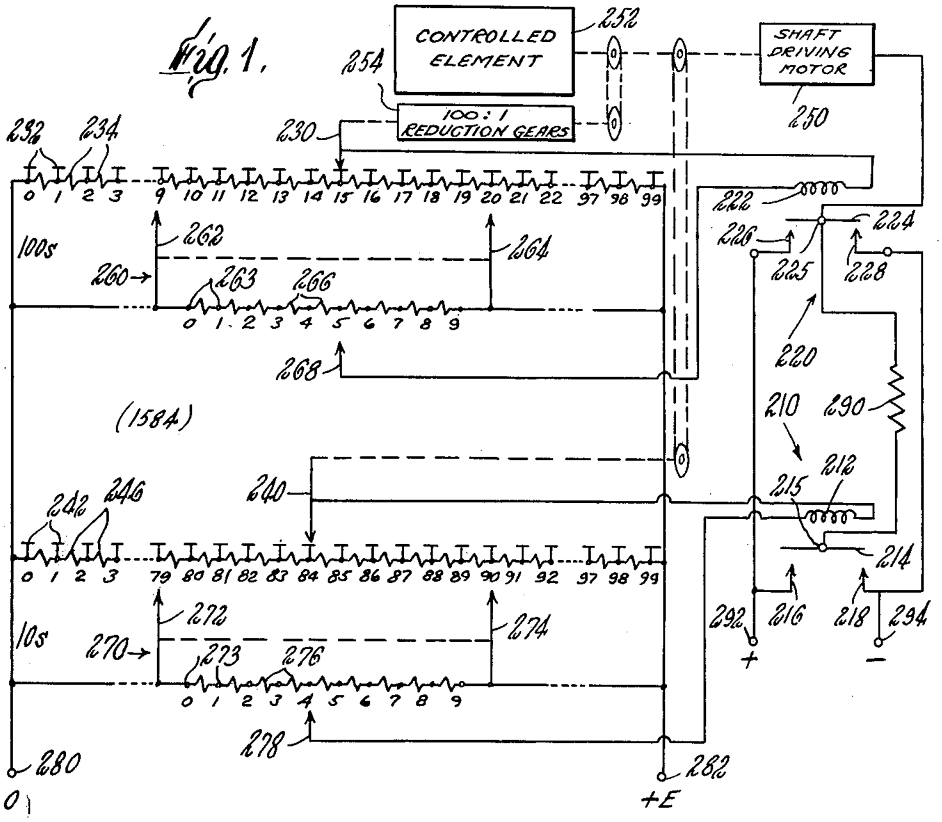
FIG. 1 is a circuit diagram showing, in simplified form, a partially diagrammatic view of a modification of the invention.

Referring first to FIG. 1, a series of double pole polarized relays with a common terminal as known to the art are used as relay means rather than electron tubes or their equivalents, such relays having their elements maintained out of contact with both their opposite connecting terminals under conditions of zero current flow through their windings, and being connected to one or the other of said terminals, depending upon the direction of current flow through their windings, see "The Design of Switching Circuits" (Bell Labs.) 1951, Van Nostrand.

As shown, a series of two polarized relays is used, a relay generally designated 210 having a control winding 212 with a current carrying element 214 having a common terminal 215 and two selectable terminals 216 and 218 being used to control the "10's" portion of the apparatus and a relay generally designated 220 similarly having a control winding 222 and element 224 with common terminal 225 and selectable terminals 226 and 228 being used to control the "100's" portion of the apparatus so that a number having four significant figures can be controlled. As the controlling element, a pair of potentiometer elements consisting of continuously rotary contactors 230 and 240 may be used, each cooperating with a plurality of fixed terminals 232 and 242 respectively with resistance elements 234 and 244 therebetween all equally spaced thereabout with said terminals herein shown as one hundred in number and being numbered "0" through "99" on the drawing with rotary contactor 230 being shown in contact with fixed terminal 232—15 and rotary contactor 240 being shown in contact with terminal 242—84. The rotary contactors 230 and 240 have suitable shafts driven by a common shaft driving motor 250 which also serves to drive the controlled element 252, such as a lath feed screw, for instance, in synchronism with rotary contactors 230 and 240, and contactor 230 is further driven at one hundredth of the speed of rotary contactor 240 by means of suitable 100:1 reduction gears 254.

To provide for setting of a known number of four significant figures into the series of fixed terminals whereby to operate the shaft driving motor 252 by means of relays 210 and 220 to move rotary contactors 230 and 240 to such number and so position controlled element 252, an adjustable switch element is provided for each of said series of terminals 232. Thus, the switch element generally designated 260 comprises two contacts 262 and 264 spaced apart a distance equal to the distance between ten terminals 234 and together movable, such contacts herein being shown as in contact with terminals 232—9 and 232—20, such contacts 262 and 264 having spaced therebetween ten terminals 263 numbered "0" through "9" and having therebetween resistors 266. An auxiliary contact 268 is provided movable along terminals 263, herein being shown contacting terminal 263—5.

Similarly, a switch element generally designated 270 is provided for the series of terminals 242 and comprises two contacts 272 and 274 spaced apart a distance including ten terminals 242 and together movable, herein shown in contact with terminals 242—79 and 242—90, such contacts having therebetween ten terminals 273 and resistors 276 of a value equal to that of resistors 244. An auxiliary contact 278 is again provided, herein shown as in contact with terminal 273—4.

A first source of D.C. voltage, preferably zero voltage, is applied at terminal 280 to terminals 232—0, 242—0, 263—0, 273—0, and to contacts 262 and 272, while a second source of D.C. voltage, E, say, 20 volts, is applied at terminal 282 to terminals 232—99, 242—99, 263—9, 273—9, and to contacts 264 and 274. Of the tens series, contacts 240 and 278 are connected to opposite ends of bistable relay control winding 212 and similarly, of the hundred series, contacts 230 and 268 are connected to opposite ends of relay coil 222. The common terminals 215 and 225 of relay elements 214 and 224 are connected together through a resistor 290, while the common terminal 225 of the highest digital series is connected to shaft driving motor 250, such arrangement being effective to "weight" the series of bistable relays so that the highest digital number effectively controls the shaft driving motor 250 until it becomes balanced and then the effective control shifts to the next highest, and so on. Current for driving the reversible shaft driving motor 250 is supplied at terminals 292 and 294, a positive voltage for driving motor 250 in one direction being applied to terminal 292 connected to relay terminals 216 and 226, and a negative voltage for driving motor 250 in the opposite direction being applied to terminal 294 connected to relay terminals 214 and 224.

In operation, assuming that the controlled element 252 is to be positioned in accordance with the four significant digit number "1584," the tens switch element 270 is set as shown with contact 272 on terminal 242—79 and contact 274 on terminal 242—90 and contact 278 on terminal 273—4, to represent the digits "84" and the hundreds switch element 260 is set as shown with contact 262 on terminal 232—9 and contact 264 on terminal 232—20, and contact 268 on terminal 263—5, to represent the digits "1500." In each series this will result in a voltage of, say, zero volts being applied at the left-hand side of the drawing up to terminals 232—9 and 242—79 and a voltage of, say 20 volts being applied at the right-hand side of the drawing from terminals 232—20 and 242—90, with a stepped voltage therebetween, of a value of, say 10 volts at contact 268 and of, say 8 volts at contact 278. If the rotary contactors 230 and 240 are positioned as shown, there will also be a value of, say 10 volts at contact 230 and of 8 volts at contact 240, so that no current will flow through relay coils 212 and 222 and their elements will remain balanced as shown and so prevent the application of any voltage to shaft driving motor 250 so that it will remain in position.

Suppose, however, that switch elements 260 and 270 being set as described above, contactor 230 is on terminal 232—3 and contactor 240 is on terminal 242—97. Under these circumstances, a zero voltage appears on contactor 230 carrying current to flow from contact 268 (10 volts) through relay coil 222, and so pulling in switch element 224 against its terminal 226. This connects motor 250 through terminals 225 and 226 to a source of positive voltage, thereby tending to rotate contactor 230 to move it to the right, as shown in FIG. 1. At the same time, a 20 voltage appears on contactor 240, causing current to flow from contact 278 (8 volts) through relay coil 212 and so pulling in switch element 214 against its terminal 218. This connects motor through its terminals 215 and 218 to a source of negative voltage, thereby tending to rotate contactor 240 to move it to the left as shown in FIG. 1. However, due to the presence of resistor 290, the current applied by coil 222 provides the greater current flow in motor 250 so that it rotates in a direction to move the contactors 230 and 240 to the right as shown in FIG. 1, as well as moving controlled element 252 in the proper direction, until contactor 230 reaches terminal 232—15, and relay element 224 opens. Relay 210 is then able to control, and it moves the contactors in whatever direction is called for by the then position of contactors 240. Thus, if contactor 240 then be on terminal 242—87, for example, relay element 214 will be against its contact 218, thus connecting motor 250 to a source of negative voltage at terminal 294 and causing motor 250 to rotate contactor 240 to move it to the left as shown in FIG. 1 until it reaches terminal 242—84, thus finally positioning controlled element 252.

The continuously rotatable switches of the type herein described, wherein a number having two significant figures may be represented by and stored as any angular shaft position, with numbers having even more significant figures representable by a series of such disks interconnected by reduction gears having known tooth ratios, are well known in the art and will not be herein further described. Such switches are modified for use in the present invention, as above set forth, by utilizing resistors connected between their terminals together with auxiliary switching elements, either manually or automatically actuated by any suitable means, so that they can provide to the control means of the relays the essential controlling voltages, and in a reversible manner. However, other input converting means may be used with the polarized relays of the circuit of FIG. 1.

Figure 2:
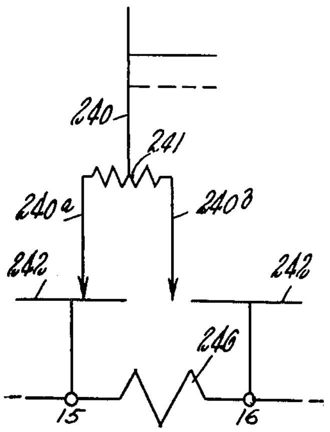
FIGS. 2 and 3 are detail views of minor modifications of portions of the circuit of FIG. 1.
Figure 3:
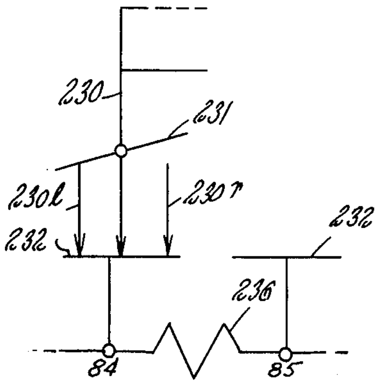

In FIGS. 2 and 3 are shown modifications of the circuit of FIG. 1, particularly relating to the rotary switches thereof, which aid in reducing ambiguities and other possible sources of error which might otherwise occur therein because of the necessary spaces between individual terminals 232 and 242 of their respective series.

Thus, as shown in FIG. 2, the tens portion of the device of the invention may have its rotary contactor 240 in the form of a pair of contactors 240*a* and 240*b* spaced apart by a distance greater than the open distance between adjacent terminals 242 as shown so that at least one of said contactors 240*a* or 240*b* is always certain to be on a terminal 242. Preferably, a resistor 241 is provided between contactors 240*a* and 240*b* with the center tap thereof being connected to relay coil 212, although an end may be used if desired. In operation such an arrangement prevents an error due to a single contactor being positioned between two adjacent terminals but not touching either while the center tapped resistor 241 makes certain a rest position of such two contactors with both of them in contact with the same terminal 242.

As shown in FIG. 3, in order to avoid the ambiguity that might exist, due to machine errors, if a number were of the order of 1599–1601, to prevent, say, an erroneous reading of "1501" or "1699," three contactors may be used, a central contactor 230*d*, as before, with a side contactor 230*l* and 230*r*, one on each side of the central contact 230 and spaced a distance therefrom equal to one-quarter of the distance between the centers of terminals 232, a switch 231 being provided selectively to connect one or the other of contactors 230*l* or 230*r* to central contactor 230.

With such an arrangement, the position of switch 231 may be selected in accordance with the number set into the machine by contactors 260 and 270, so that, for example, with a number having unit digits from zero to four, contactor 230*l* may be connected to contactor 230, while with a number having unit digits from five to nine, the contactor 230*r* may be connected to contactor 230.

In FIG. 3 is shown a modification of the relay type of comparator of the invention in some respects simplified from that of FIG. 1, utilizing machine element position responsive potentiometer elements, specifically two decade continuously rotatable switches and a single hundreds continuously rotatable switch, all mounted for rotation together through appropriate gearing so that the decade representing the highest significant figure makes one turn during the machine element travel, the next ten turns and the last one hundred turns.

First as to the decade switches, generally designated as 300 and 400, such switches may be identical, although the circuitry used with the highest significant digit is simplified from that of succeeding switches, as will later appear in more detail. Hence, the next highest decade switch 400 and its associated circuitry will be first described. The stationary element of one of such switches, specifically switch 400, although switch 300 is identical, is shown in FIG. 5 with its rotary contactors superimposed thereon. Thus, the stationary element includes an insulating plate with an angularly arranged series of ten metallic fixed terminals 412—0 through 412—9 slightly spaced from another so as each to include somewhat less than 36 degrees. Terminals 412—2 and 412—7 are in addition, at least with all decade switches other than that of the highest digit, split into halves, 412—2*a* and 412—2*b* and 412—7*a* and 412—7*b*, slightly spaced from one another so as to include somewhat less than 18 degrees. Two rotary contactors 430 and 440 are used in conjunction with the stationary element, each having a pair of contactors 431 and 433 and 441 and 443, respectively, with resistors 432 and 434 and 442 and 444, respectively, in series therewith and connected together at their other ends to single contactors 435 and 445 respectively. The contactors of each of rotary contactors 430 and 440 are spaced 9 degrees of angular rotation from one another, with the centers thereof spaced 18 degrees from one another and run in electrical contact with terminals 432—0 through 432—9 as they revolve relatively thereto. Single contactors 435 and 445 respectively run on slip rings 436 and 446. In the interest of clarity, FIG. 4 shows the rotary switch in a straight line configuration, with FIG. 6 being an enlargement of the rotary contactor portion thereof to better show its angular relationships with that of the terminals 412—0 through 412–9.

Figure 4:
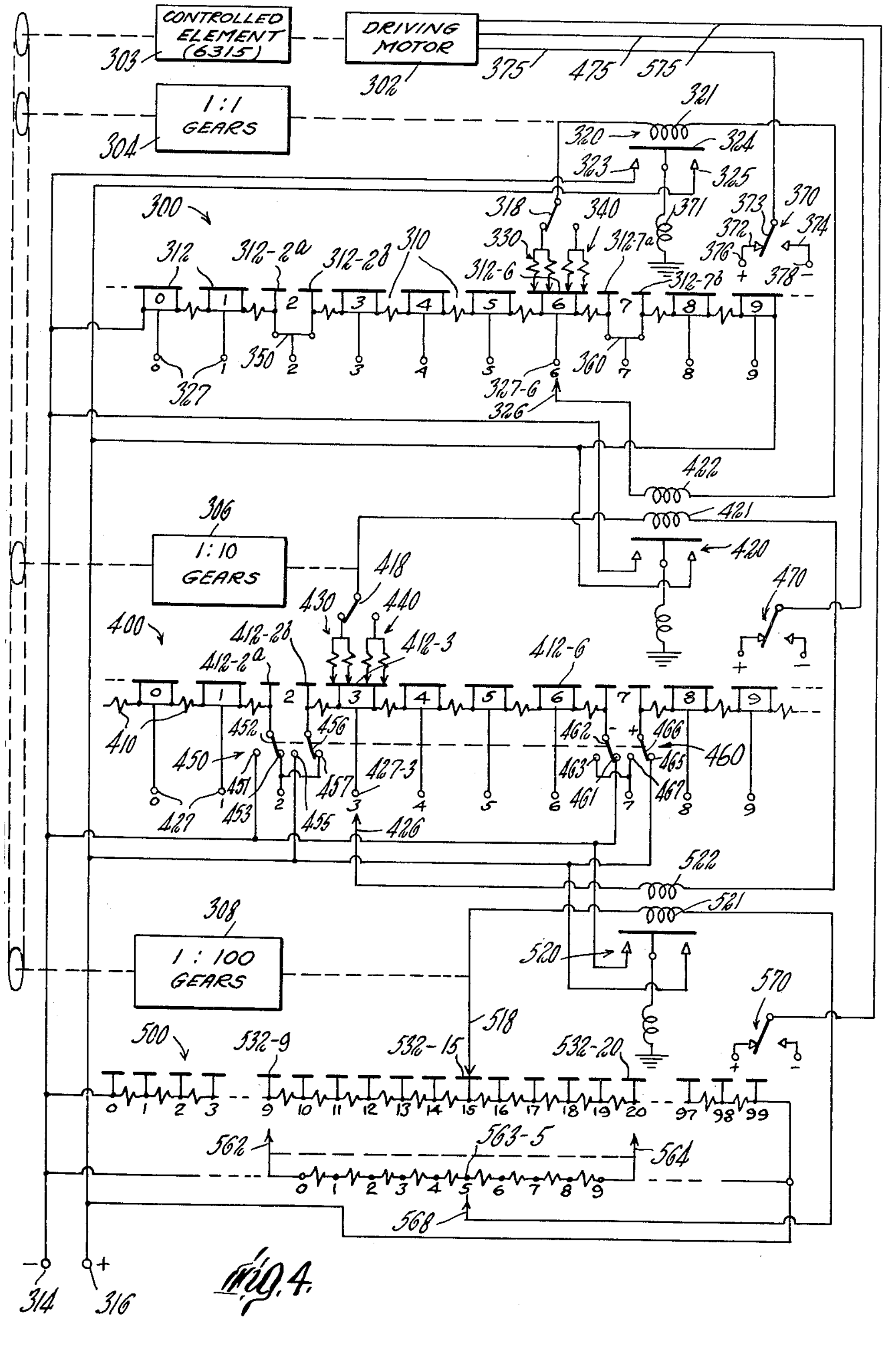
FIG. 4 is a circuit diagram showing; in simplified form, a partially diagrammatic view of a fourth modification of the invention closely related to that of FIG. 1 and, FIGS. 5 and 6 are diagrammatic views of rotary switch elements utilized with the circuit of FIG. 4.
Figure 5:
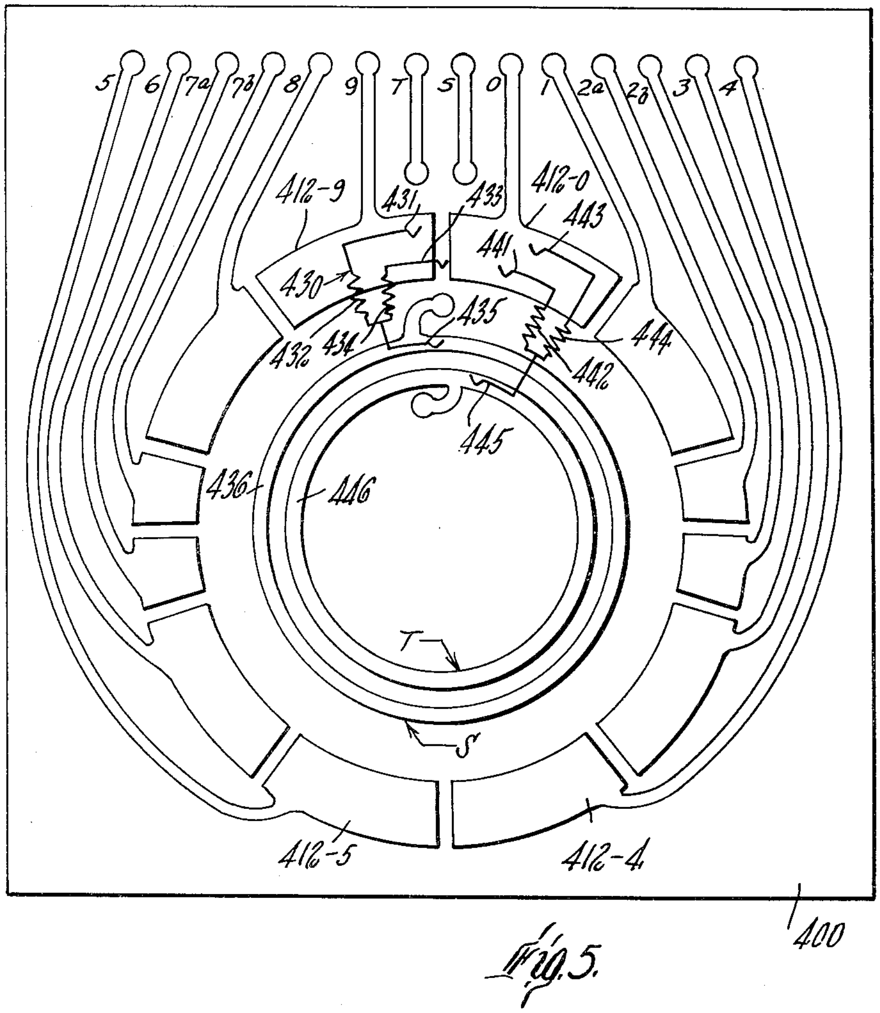

Referring to said latter FIG. 4, it will be seen that each of the complete terminals has connected between it and its neighbor a resistor 410 so that a series of resistors is provided continuously around the decade switch except at its terminals 412—2*a* and 2*b* and 412—7*a* and 7*b*. At those terminals interconnected double pole double throw switches generally designated 450 and 460 are provided so as to selectively permit the application of voltage across one of terminals 412—2*a* or 412—2*b* while connecting across the other. To accomplish this, the movable elements 452 and 456 and 462 and 466 of such switches may be switched between pairs of terminals 451, 453 and 455 and 457 and between 461, 463 and 465, 467. Terminals 451 and 461 are connected to a source of negative voltage supplied at circuit control voltage input 314. Terminals 455 and 465 are connected to a source of positive voltage supplied at circuit control voltage input 316. Terminals 453 and 457 are interconnected so that the two halves of terminal 412—2*a* and 412—2*b* will be connected with the switch in its right-hand position as shown in FIG. 4. Terminals 463 and 467 are similarly interconnected to connect the two halves of terminal 412—7*a* and 412—7*b*. Such split terminals need not be used with the switch 300 utilized for the highest digit, so that the split halves of its terminals 312—2*a* and 2*b* and 312—7*a* and 7*b* are simply connected together as shown by lines 350 and 360 respectively, and resistor 310 is omitted between terminals 312—0 and 312—9, such being connected to sources of positive and negative voltage as shown.

The rotary contactors 430 and 440 are provided with a selector switch having a movable element 418 connected through relay control windings 421 and 522 to the contact 426 movable along a series of terminals 427—0 through 327—9 respectively connected to terminals 412—0 through 412—9, with terminal 427—2 being connected to the interconnected terminals 453, 457 of switch 450 and terminal 427—7 being connected to the interconnected terminals 463, 467 of switch 460. In decade switch 300, the corresponding terminals 327—0 through 9 are similarly connected, except that terminals 327—2 and 327—7 are respectively connected to split terminal interconnecting lines 350 and 360 respectively. Hundreds rotary switch 500 is identical to those described above in connection with the embodiment of FIG. 1 and need not be further described. It should be noted however, if more significant digits than four be needed so that additional decade switches be needed, such switches and their circuitry must be arranged as with decade switch 400. Too, other means, such as a linear potentiometer, for example, may be substituted for said switch 500.

As with the embodiment of the invention explained in connection with FIG. 1, preferably a series of polarized relays 320, 420 and 520 is used in conjunction with motor controlling relays 370, 470 and 570 to control the driving motor 302 which operates the controlled machine element and in turn the movable potentiometer element contactors through appropriate gears 304, 306 and 308. Thus, the relay utilized with the above described first decade has a control winding 321, a common element 324 and selectable terminals 323 and 324 connected respectively to negative voltage input 314 and positive voltage input 316. Associated with said polarized relay is a motor controlling relay 370 having its winding 371 connected in series with common element 324, so that current will flow therethrough in one direction or the other depending upon the position of said common element. The movable element 373 of said motor control relay is thus caused to connect one of its terminals 372 or 374 to positive or negative voltage respectively at its terminals 376 or 378 so that said movable element energizes line 375 to drive motor 302 at an appropriate speed and in the proper direction.

The embodiment of FIG. 4 also differs from that of FIG. 1 in the means effective to "weight" the series of relays 320, 420 and 520 to provide a progressively less effective control from the highest significant figure to the lowest significant figure. This is accomplished by means of overriding auxiliary relay control windings in series with the normal relay control winding of the next highest significant figure controlling stage. More specifically, relay 420, in addition to being provided with its normal control winding 421 in series with one of its paired rotary contactors 430 or 440 as selected by switch 418, also has an overriding control winding 422 in series with the normal control winding 321 of preceding relay 320. With this arrangement, so long as the highest decade is unbalanced so that current flows through coils 321 and 422, relay 420 will be controlled by its overriding coil 422 rather than its normal coil 421 so that its motor control relay 470 will cause motor 302 to be operated in the same direction as it is being caused to operate by motor control relay 370. Relay 520 is similarly provided with an overriding winding 522 connected to winding 421 of the preceding decade. In addition, the series of motor control relays 370, 470 and 570 either utilize decreasing power inputs to motor 302 or are connected to decreasingly effective windings so that motor speed is decreased as the control shifts toward the least significant figure. Of course, other means than polarized relays and associated means may be provided to achieve the decreasingly effective control of the drive characteristic of this invention.

In operation, assuming that the controlled element 303 is to be positioned in accordance with the four significant digit number "6315," the tens switch 500 is set as shown with contact 562 on terminal 532—9 and contact 564 on terminal 532—20, and contact 568 on terminal 563—5 to represent the tens digits "15." The hundreds switch 400 is set as shown with its contact 426 on terminal 427—3 to represent the hundreds digit "300" and the thousands switch 300 is set as shown with its contact 326 on terminal 327—6 to represent the thousands digit "6000."

The switches 318, 418 to select one of a pair of contactors 330, or 340, 430 or 440, are set to their leading or lagging position according to the digit set into the succeeding decade. More specifically, with decade switch 300, the digit set into the next succeeding decade switch 400 being "3," the switch 318 is set to the leading contactor 340. As can be seen most clearly in FIG. 6, this will in effect result in the contactor leading by 9 degrees so that the effective center of the next lower contactor 430, 440 will be within two segments between "2.75" and "3.75" and can readily advance into the "3" segments if not already there. Similarly, switch 418 is set to its leading contactor 440 since the next succeeding decade is "15." In brief, the leading contactor, the right-hand contactors 340, 440, etc. are used if the next succeeding digit be from 0 through 4 and the trailing contactor, the left-hand contactors are used if the next succeeding digit be from 5 through 9. The use of paired contactors has been explained above in connection with FIG. 2 to avoid the possibility of a contactor being positioned in the non-conducting space between the segmented terminals.

The double pole double throw switches 450 and 460 are set in a manner to eliminate the possibility of ambiguous readings at the necessary break in the step voltage around the decade. However, since switch 300 never need make more than a single turn, being so limited by the travel of the controlled element 303, the voltage discontinuity between terminals 312—0 and 312—9 is not a problem. The same is not true of switch 400 and any succeeding decades. Thus, in rotary switch 400, since the digit to be set therein is "3," the voltage from the input terminals 314, 316 is applied across terminals 312—7*a* and 7*b* and terminals 312—2*a* and 2*b* are connected together by moving the switch elements 452, 456, 462 and 466 of switches 450 and 460 to the right as shown in FIG. 4. In general, the switches 450, 460, etc. are set so that the open half terminals are as far as possible from the digit to be set in, so that if a digit from 0 to 4 is to be set in, the voltage discrepancy is applied across terminals 7*a* and 7*b*, while with a digit from 5 to 9, the voltage is applied across terminals 2*a* and 2*b*. The provision for selection between lagging or leading contactors spaced by about half the segment angle, in combination with a pair of split terminals in a rotary segmented contactor, together with switching means selectively to utilize one of said split terminals to apply voltage to the contactor ring while connecting the other split terminal together to make it part of the ring makes possible simplified non-ambiguous rotary contactor control systems and is an important feature of the invention. This is principally due to the ambiguity introduced when the digit to be set in occurs in the vicinity of the voltage discontinuity necessarily introduced between at least two segments of a voltage dividing ring.

It will be understood that, although the various setting switches described above are shown herein as simple manually operated switches, more sophisticated circuitry capable of operating such switches from a suitable push button control console or the like, or magnetic tape, punched tape or similar coded inputs would customarily be employed, not only as to the actual numerical input switches such as 326, 426, and 562, 564 and 568, but also as to the setting of switches 318 and 418 and 450, 460 as determined by the setting of said numerical input switches.

After the various settings have been made, the driving motor 302 will be operated to move the controlled element to a position designated as "6315" herein and at the same time appropriate position signals will be presented as angular displacements of the rotary switches 300, 400, 500 through their gears 304, 306 and 308. For example, assuming that 10 volts be applied across input terminals 314 and 316, if the controlled element be originally positioned at "4444" assuming 10 volts across said input terminals, the voltage difference between the first decade terminal 327—6 (6 volts) and terminal 312—4 (4 volts) will cause a current flow through winding 321. This will pull in relay element 324 against contactor 325 to cause a current flow in the positive or advancing sense through motor control winding 371, pulling in its element 373 to its positive contactor to cause the motor 302 to turn at high speed so as to quickly advance the controlled element and the contactors 330, 340. The current flow through overriding winding 422 in the next decade will also cause the motor to advance, irrespective of any current flow through winding 421.

When both legs of the paired contactor 340 arrive on terminal 312—6, that is with the effective center of contactors 330, 340 somewhere in a position on terminals 312 between 5.75 and 6.75, current will cease to flow through coils 321 and 422, causing relays 320 and 370 to go to their neutral positions cutting off the current flow through the high speed motor input 375. Decade switch 400 will then take over the control of the motor in a similar manner, since its normal relay winding 421 is able to control relay 420 because of the zero current flow through overriding coil 422.

Assume that the controlled element is then positioned at "6666." Current will flow between terminal 412—6 (6 volts) and terminal 427—3 (3 volts) to operate relay 420 and run motor 302 at an intermediate speed by relay 470, while causing relay 520 to operate motor 302 in the same direction because of the current flow through overriding coil 522. Again, when the contactor 440 reaches terminal 412—3, with the center of contactors 430, 440 between 2.75 and 3.75 thereof, current flow through windings 421 and 522 will cease, as will the supply of current to motor 302 from relay 470.

Switch 500 will then take over the motor control. Assume that its contactor 518 is positioned at "6319." The voltage difference between its terminal 532—20 and 568 will cause current to flow through relay winding 521 to operate motor control relay 570 at the lowest speed until the contactor is positioned on terminal 532—15 as shown. Relays 520 and 570 then seek their neutral position, and the motor 302 stops with controlled element 303 positioned at "6315."

Figure 6:
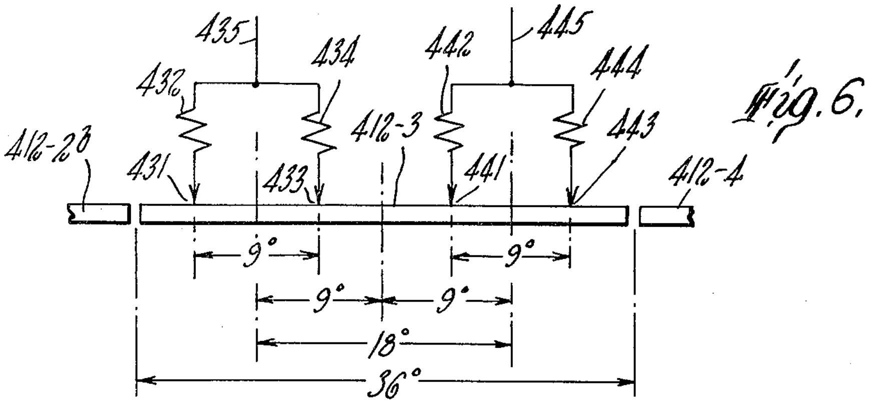

The structure above described in connection with FIGS. 4 through 6, provides an especially simple and accurate means for operating and controlling a machine element such as a machine tool to position it along an axis, the novel utilization of a selectable position for the necessary voltage discontinuity together with the selection of a leading or lagging contactor position being largely responsible for its unique performance. Any required degree of accuracy may be achieved, too, by increasing the number of decade elements such as that at 400 simply to accommodate the required number of significant figures. Of course, duplicate systems can be used for simultaneous positioning along other machine axes as well.

Thus, with a control system for operating a machine or other element to be controlled positionally, expressed as two or more significant figures, the machine element control means such as a relay as described herein representing the higher of any two adjacent significant figures has a contactor element consisting of two spaced contactors, preferably paired, one being selected according to the next succeeding significant figure of the next succeeding decade. The potentiometer having two pairs of electrically unconnected terminals is switched according to its own significant figure to position the voltage discontinuity most advantageously. Either of these expedients are useful alone to a degree, but together they make possible unexpectedly high accuracy in a relatively simple structure which can be applied to many types of machine tools, for example. As a practical matter, the specific means shown in FIGS. 4 through 6 has proved to be a useful one, but other means than polarized relays having both auxiliary and control windings may be utilized to provide a progressively less effective control along the series from the highest to the lowest significant figures.

Thus, it will be seen that the invention provides a novel control system especially useful for operating a machine element to be controlled positionally expressed as a plurality of significant figures by means of which, for instance, a number may be equated to a preset number, or the like, without the necessity of counting such number by the usual digital techniques. Various modifications of the invention within the spirit thereof and the scope of the appended claims but not herein specifically disclosed, will be apparent to those skilled in this art.

I claim:

1. A control device including a digital comparator for comparing numbers having a plurality of significant figures comprising a series of voltage comparing polarized relays each effective to compare corresponding significan figures of said number in terms of voltages applied thereto, said polarized relays each having a control winding connected at its opposite ends to two sources of voltage representing corresponding significant figures to be compared, and an output current carrying element having a common terminal and two alternately selectable terminals for applying opposite voltages to said element, said output current element being responsive to direction of current flow through said control winding to selectively connect one of said selectable terminals to said common terminal, and being responsive to substantially zero current flow through said control winding to simultaneously disconnect both of said selectable terminals, resistance means interconnecting said common terminals of said output current carrying elements of said series effective to shift control of said output from said series of relays progressively and sequentially from said relays for said highest significant figure to that of said lowest significant figure by providing a progressively less effective control, and means responsive to said direction of output current effective to vary at least one of said voltages applied to said control winding.

2. A control device as claimed in claim 1 including switch means for each of said relays, said switch means having a plurality of terminals and a switching element movable respectively thereto, means for applying a source of voltage to said terminals to provide thereon a series of voltages representing digital numbers, means for selectively connecting a voltage representing a preset number to one end of said control winding, means for connecting said switching element to the other end of said control winding, and power means operable by said output current for relatively moving said element and said terminals in a direction toward balance of voltages applied to said control winding.

3. A control device as claimed in claim 2 wherein said power means moves the elements of successive switch means at speed ratios equivalent to the ratios of the significant figures represented by the relays associated therewith.

4. A control device as claimed in claim 3 wherein said switch means are of the continuously rotatable type, and said power means includes gear means for driving successive switch means at said ratios.

5. A control system including a digital comparator for comparing numbers having a plurality of significant figures comprising a series of voltage comparing relay means each effective to compare corresponding significant figures of said number in terms of voltages applied thereto, each of said relay means having control means including rotary potentiometer means having a series of terminals with resistors therebetween and a contactor element movable respectively thereto, means for applying a source of voltage to each of said series of terminals to provide thereon a series of step voltages representing digital numbers, terminal selector switch means for selectively connecting a terminal of said series representing a predetermined significant figure to said relay means, and means for connecting said contactor element to said relay means, power means operated by said relay means for relatively moving all of said contactor elements and said series of terminals in a direction toward balance of voltages applied to said relay means, and means interconnecting said relay means of said series of relay means effective to shift control from said series of relay means progressively and sequentially from said relay means for the highest significant figure to that of said lowest significant figure by providing a progressively less effective control along said series of relay means.

6. A control system as claimed in claim 5, wherein said power means includes means for driving successive potentiometer means at speed ratios equivalent to the ratios of the significant figures represented by the relay means associated therewith.

7. A control system as claimed in claim 5 wherein each of said relay means comprises a polarized relay effective to compare voltages applied thereto, said polarized relays each having a control winding connected at its opposite ends to a contactor element and a terminal selector switch means of one of said relay potentiometer means and an output current carrying element responsive to direction of current flow through said control winding controlling said power means.

8. A control system as claimed in claim 7 wherein said output current carrying element is responsive to substantially zero current flow through said control winding effective to lose control of said power means.

9. A control system as claimed in claim 7, wherein at least one of said polarized relays has an auxiliary winding of the next successive polarized relay connected thereto to render said next successive relay ineffective to control said power means during current flow through said control winding of the preceding relay.

10. A control system for operating a machine element to be controlled positionally expressed as at least two significant figures, comprising power means for moving said element, at least two relay means for operating said power means, the first of said relay means representing the higher of said significant figures having control means including machine element position-responsive potentiometer means and a contactor element therefor connected to said first relay means, and selector switch means for selectively connecting a point on said potentiometer means representing the predetermined higher significant figure to said first relay means, the second of said relay means representing the next higher of said significant figures having control means including machine element position-responsive potentiometer means and contactor means therefor, and terminal selector switch means for selectively connecting one of said terminals representing the predetermined lower significant figure to said second relay means representing said next higher significant figure, said potentiometer means corresponding to said second highest significant figure being driven in predetermined ratio relative to that of the next preceding said potentiometer means with said pair of contactors of said next preceding potentiometer means being switched in accordance with the value of said lower significant figure, said power means being successively operated by said first and second relay means to a position of balance of each of their associated potentiometer means.

11. A control system as claimed in claim 10 wherein the potentiometer means of the first of said relay means includes a pair of contactors spaced from one another and contactor switch means for preselecting a leading or lagging one of said pair for connection to said first relay means, said pair of contactors being switched in accordance with the value of the lower significant figure.

12. A control system as claimed in claim 10 wherein the potentiometer means of the second of said relay means includes a series of potentiometer terminals having at least two pairs of adjacent terminals thereof electrically unconnected and segment switch means for alternately switching said pairs to electrically connect one of said pairs together and to apply voltage across the other of said pairs.

13. A control system for operating a machine element to be controlled positionally expressed as at least two significant figures, comprising power means for moving said element, at least two relay means for operating said power means, the first of said relay means representing the higher of said significant figures having control means including machine element position-responsive potentiometer means and a contactor element therefor including a pair of contactors spaced from one another and contactor switch means for preselecting a leading or lagging one of said pair for connection to said first relay means, and selector switch means for selectively connecting a point on said potentiometer means representing the predetermined higher significant figure to said first relay means, the second of said relay means representing the next higher of said significant figures having control means including machine element position-responsive potentiometer means and contactor means therefor with a series of potentiometer terminals having at least two pairs of adjacent terminals thereof electrically unconnected and segment switch means for alternately switching said pairs to electrically connect one of said pairs together and to apply voltage across the other of said pairs, and terminal selector switch means for selectively connecting one of said terminals representing the predetermined lower significant figure to said second relay means representing said next higher significant figure, said potentiometer means corresponding to said second highest significant figure being driven in predetermined ratio relative to that of the next preceding said potentiometer means with said pair of contactors of said higher significant figure potentiometer and said lower significant figure potentiometer being switched in accordance with the value of said lower significant figure, said power means being successively operated by said first and second relay means to a position of balance of each of their associated potentiometer means.

14. A control system for operating a machine element to be controlled positionally expressed as at least three significant figures, comprising power means for moving said element, at least three relay means for operating said power means, the first of said relay means representing the highest of said significant figures having control means including machine element position-responsive potentiometer means having a series of terminals and a contactor element therefor including a pair of paired contactors spaced from one another and contactor switch means for preselecting a leading or lagging one of said pair for connection to said first relay means, and selector switch means for selectively connecting one of said terminals of said potentiometer means representing the predetermined higher significant figure to said first relay means, the second of said relay means representing the next highest of said significant figures having control means including machine element position-responsive potentiometer means and contactor means therefor including a pair of paired contactors spaced from one another and contactor switch means for preselecting a leading or lagging one of said pair for connection to said second relay means with a series of potentiometer terminals having at least two pairs of adjacent terminals thereof electrically unconnected and segment switch means for alternately switching said pairs to electrically connect one of said pairs together and to apply voltage across the other of said pairs, and terminal selector switch means for selectively connecting one of said terminals representing the predetermined lower significant figure to said second relay means representing said next highest significant figure, the third of said relay means representing the lowest of said significant figures having control means including machine element responsive potentiometer means and contactor means therefor and selector switch means for selectively connecting a point on said potentiometer means representing the predetermined lowest significant figure to said third relay means, said potentiometer means each being driven in predetermined ratios relative to that of the next preceding said potentiometer means with each said pair of contactors of a higher significant figure potentiometer and a terminal selector switch means of a lower significant figure potentiometer being switched in accordance with the value of said lower significant figure, said power means being successively operated by said relay means representing said highest to said lowest significant figures to a position of balance of each of their associated potentiometer means.

15. Controlled element error compensating means including a differential mechanism, differential controlled element driving means and error signal generating means, one input of said differential mechanism being driven by said controlled element driving means and another input of said differential means being driven by a differential error signal from said error signal generating means and the output of said differential mechanism driving an element to be controlled, said differential driving signal being provided by comparison of said error signal generating means driven by said element to be controlled and means driven by said error signal.

16. Means as claimed in claim 15 wherein said error signal generating means includes a series of resistors having voltages thereon representing error values of said controlled element, and means for comparing said error values with predetermined values to drive an input of said differential to balance of said error values with said predetermined values.

17. A control device including a digital comparator for comparing numbers having a plurality of significant figures comprising a series of voltage comparing relay means each effective to compare corresponding significant figures of said number in terms of voltages applied thereto, said relay means each having control means connected to two sources of voltage representing corresponding significant figures to be compared and output producing means responsive to a condition of said control means providing at least two discrete output conditions, means interconnecting said output producing means of said series effective to shift control of said output from said series of relay means progressively and sequentially from said relay means for said highest significant figure to that of said lowest significant figure by providing a progressively less effective control along said series of voltage comparing relay means, and means responsive to said output conditions effective to vary at least one of said voltages applied to said control means, said relay means being polarized relays, each having a control winding and output current carrying element having a common terminal and two alternately selectable terminals, said current carrying element being responsive to direction of current flow through said control winding to selectively connect one of said selectable terminals to said common terminal, and said interconnection means being connected between said common terminals of successive relays.

References Cited in the file of this patent

UNITED STATES PATENTS

| | | |
|---|---|---|
| 2,537,427 | Seid et al. | Jan. 9, 1951 |
| 2,625,822 | Nichols | Jan. 20, 1953 |
| 2,631,212 | Lindsay et al. | Mar. 10, 1953 |
| 2,676,253 | Ayres | Apr. 20, 1954 |
| 2,711,499 | Lippel | Jan. 21, 1955 |
| 2,736,878 | Boyle | Feb. 28, 1956 |
| 2,775,754 | Sink | Dec. 25, 1956 |
| 2,791,666 | Daily et al. | May 7, 1957 |
| 2,792,545 | Kamm | May 14, 1957 |
| 2,811,665 | McNaney | Oct. 29, 1957 |
| 2,839,744 | Slocomb | June 17, 1958 |
| 2,840,771 | Kamm | June 24, 1958 |
| 2,849,667 | McMullin | Aug. 8, 1958 |
| 2,870,430 | Hancock | Jan. 20, 1959 |
| 2,872,670 | Dickinson | Feb. 3, 1959 |
| 2,896,198 | Bennett | July 21, 1959 |
| 2,927,293 | Dion | Mar. 1, 1960 |

OTHER REFERENCES

Nettell, Digital Methods in Control System, Electronic Engineering, volume 28, No. 337, pages 108–114, March 1956.